(12) United States Patent
Janik et al.

(10) Patent No.: US 7,360,433 B2
(45) Date of Patent: Apr. 22, 2008

(54) FILTER CHANGE INDICATOR

(75) Inventors: Leon P. Janik, Suffield, CT (US);
Stephen J. Vardion, Glastonbury, CT (US); Michael J. Williams, Glastonbury, CT (US)

(73) Assignee: Stanadyne Corporation, Windsor, CT (US)

(*) Notice: Subject to any disclaimer, the term of this patent is extended or adjusted under 35 U.S.C. 154(b) by 0 days.

(21) Appl. No.: 11/601,508

(22) Filed: Nov. 17, 2006

(65) Prior Publication Data
US 2007/0137305 A1   Jun. 21, 2007

Related U.S. Application Data

(62) Division of application No. 10/930,970, filed on Aug. 31, 2004, now Pat. No. 7,137,303.

(51) Int. Cl.
*G01L 7/16* (2006.01)

(52) U.S. Cl. .......................... 73/744; 116/268
(58) Field of Classification Search ................ 73/744; 116/268

See application file for complete search history.

(56) References Cited

U.S. PATENT DOCUMENTS

| 3,532,069 A | 10/1970 | Moon, Jr. |
| 4,153,003 A | 5/1979 | Willis |
| 4,184,376 A * | 1/1980 | Thomas et al. ............. 73/709 |
| 4,272,368 A | 6/1981 | Foord et al. |
| 4,366,717 A | 1/1983 | Foord et al. |
| 4,654,643 A | 3/1987 | Meisenheimer, Jr. |
| 4,688,511 A * | 8/1987 | Gerlach et al. ............. 116/268 |
| 4,818,385 A | 4/1989 | Medley, III |
| 5,351,035 A * | 9/1994 | Chrisco ..................... 340/607 |
| 6,190,442 B1 | 2/2001 | Redner |
| 2004/0113803 A1 | 6/2004 | Keown |

* cited by examiner

*Primary Examiner*—Andre J. Allen
(74) *Attorney, Agent, or Firm*—Alix, Yale & Ristas, LLP

(57) ABSTRACT

A fluid system pressure indicator is adapted for use in fluid systems having a filter element. The fluid system force indicator includes a housing partitioned to be exposed to the fluid system to provide transmission of a mechanical force between these partitioned environments to indicate the fluid pressure. This exterior shape change is such that it can be identified through tactile means not requiring visual identification.

20 Claims, 11 Drawing Sheets

FILTER CHANGE INDICATOR

CROSS REFERENCE TO RELATED APPLICATIONS

This application is a divisional of U.S. patent application Ser. No. 10/930,970, filed Aug. 31, 2004 now U.S. Pat. No. 7,137,303.

FIELD OF THE INVENTION

The present invention relates to fluid systems having a filtration device in which restriction of the filtration device can be determined by measurement of pressure. More specifically, the invention relates to devices for indicating whether a fluid filter is effective and/or requires replacement.

BACKGROUND OF THE INVENTION

Fluid systems requiring filtration apparatus are an integral part of the automotive and heavy equipment industries. Engine systems, hydraulic systems and various other collateral systems require fluids such as air, oil, fuel and coolants to be at least partially contained and directed to their functional end points.

For instance, in engine systems utilizing diesel as fuel, extremely high pressure pumps are utilized. These pumps have very close tolerances and may be easily damaged or disabled if particulate laden fuel is passed through them. In addition, the fuel injectors of these engines are configured to deliver a spray of fuel in a specifically designed pattern. Interference with the passages, orifices or other structures of the injectors may result in a decrease in engine efficiency and/or damage to the engine itself. As such, many diesel fuel systems require at least one filter to be present between the fuel storage compartment and the high pressure pump.

Depending on such things as preventative maintenance scheduling, fuel quality, operating conditions, and the like, fuel filters become restricted or clogged at various rates. Filter occlusion may adversely impact engine efficiency, and in some cases, may damage or destroy components of the engine. In other cases, restriction of the filter can result in filter failure which may allow highly contaminated fluid to reach portions of the pump or injector system, resulting in extremely high repair costs for those devices.

Typically, the status of a filter, be it a gas or liquid filter, is determined through use of a pressure gauge, which is incorporated between the filter and a pump. As the filter becomes occluded with particles, the pump must maintain a higher pressure differential across the filter to maintain the same level of fluid flow required for proper engine function. As this pressure differential increases, the conventional filter monitor moves an indicator contained within a housing. The position of the indicator can be viewed through a sight window and the percent of filter occlusion can typically be determined by marks located on the gauge housing relative to the indicator within the gauge housing.

A wide variety of filter monitors or indicators exist conventionally. Some of the conventional devices utilize colors as indicators. These monitors fall into two general categories of gauges that are observed while the engine is running, and 2 gauges which maintain statically a reading of the highest differential pressure encountered during engine operation. These conventional devices have several drawbacks. They often must be cleaned of material build-up covering the sight window or be otherwise manipulated so as to allow visualization through the sight window in order to accurately determine the level of filter occlusion.

The direct visional observation requirement means that the device has to be located such that it can be viewed during pre-startup and/or post-running maintenance. As is well known in the relevant arts, the normal operation of equipment and associated fluid systems results in a buildup of material on equipment components that is often composed of oils and other fluids mixed with dust, dirt and particulates. Accordingly, the sight window of conventional pressure monitors often becomes sufficiently covered with the dust, grime, grease or other material so that the indicator is no longer visible. The inability to readily observe the indicator markings may lead to the filter check step of normal maintenance being eliminated, thus resulting in severe damage to the equipment during operation.

In addition, the principal composite materials of these conventional devices are limited to transparent plastic or glass material. In particular, the plastic materials may be damaged by heat and/or abrasion to the point that visibility through the material is significantly degraded or no longer achievable.

Several conventional filter monitoring devices utilize electronic means for the detection of pressure differentials. These devices require that the detector be energized and typically employ pressure transducers. In some instances, these electronic devices are not as dependable as mechanical indicators since a failure of the pressure transducer may occur without warning, thereby allowing an engine to be run with a heavily occluded filter, which can result in engine and/or injection system damage.

Another problem associated with detecting pressure differentials is the susceptibility to false indications caused by transient pressure pulses. Pressure spikes are commonly generated from the throttle changes and cold fuel conditions.

SUMMARY

Briefly stated, the fluid system/pressure indicator combination comprises a fluid system having a fluid pathway extending between a fluid pump and a filter element. A housing has an interior fluid portion in fluid communication with the fluid pathway. The housing has a cover with an opening. An axially displaceable pressure communicator has an actuator within the housing. The communicator is at least partially in fluid contact with the fluid system. A fluid diaphragm fluidly separates the actuator from the fluid system. An indicator spring exerts an axial pressure on the pressure communicator. A projectible indicator has an actuator engagement surface and at least one portion which is projectible through the opening to an exterior of the housing. The indicator spring exerts a biasing pressure on the indicator such that when the actuator and the actuator engagement surface are not in engagement, a portion of the projectible indicator is projected through the opening to an exterior of the housing.

In one embodiment the fluid diaphragm is an integral part of the axially displaceable pressure communicator. The fluid system includes a filter mounting base in fluid communication with the interior portion of the housing. When a pressure is applied to at least one projected portion of the indicator, the actuator will re-engage the actuator engagement surface. An impact safety feature is provided by fluid communication between the interior fluid portion and the fluid pathway is selectively interrupted by a portion of the axially displaceable pressure communicator. The portion of the axially displaceable pressure communicator is dimensioned to operatively engage a tapered bore.

A one piece component for response to a pressure differential comprises a plastic diaphragm and a plastic shaft axially projecting integrally from a central portion of the diaphragm. The diaphragm has a pre-established flexure characteristic which results in a dampened displacement of the shaft in response to a pressure of said shaft in response to a pressure differential exerted against said diaphragm.

DETAILED DESCRIPTION OF THE INVENTION

Figure 1:
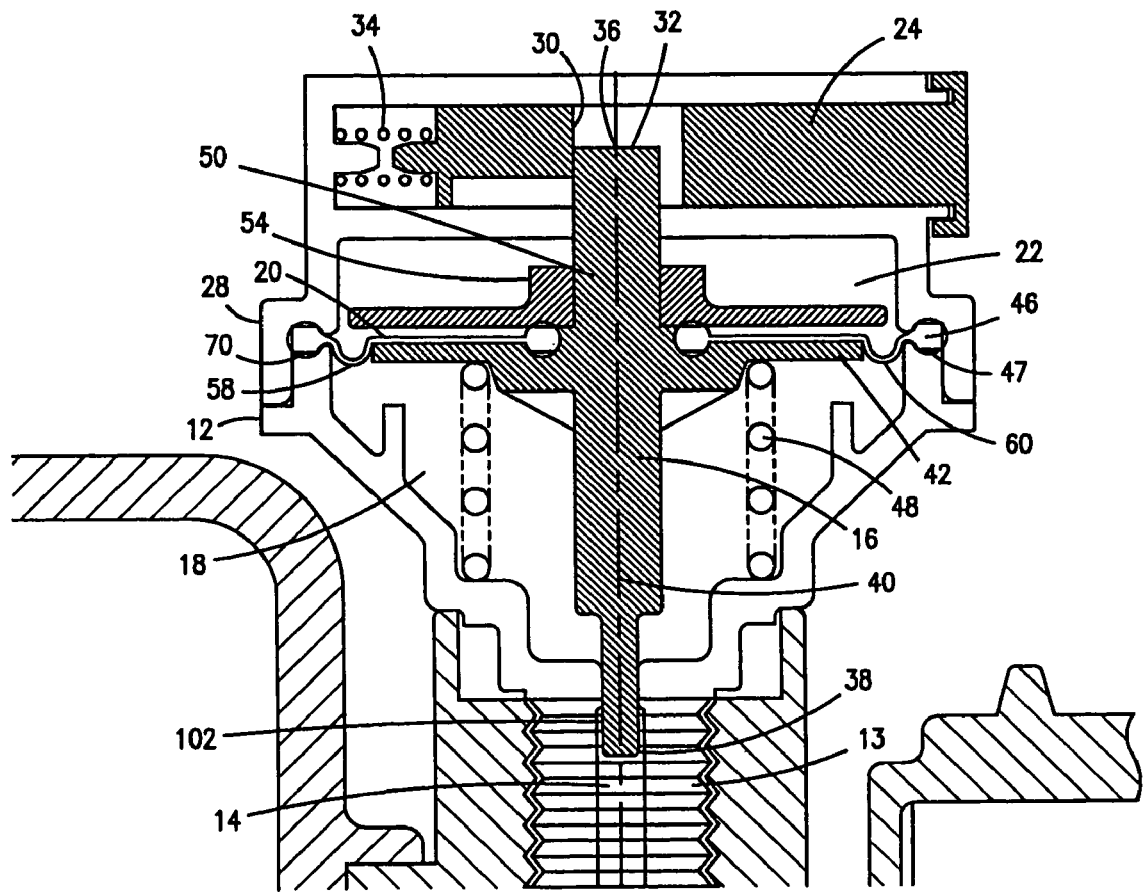
FIG. 1 is a cut-away view of a filter change indicator.

With reference to the drawings wherein like numerals represent like parts throughout the several figures, a filter change indicator is generally designated by the numeral 10. The filter change indicator 10 is preferably incorporated into a filter system to provide a tactile indication of the filter condition to aid in the determination as to whether the filter requires replacement. The filter change indicator 10 has an efficient and low cost construction and is, for example, constructed from combinations of low cost materials such as plastic, metal, ceramic or other materials. For example, the principal material may be molded ABS plastic.

The filter change indicator 10 includes a graduated multi step housing 12, which partially forms a containment vessel or fluid portion 18. The exterior of the housing is preferably configured to be integrated into a fluid line, plenum or housing through such features as a threaded plug portion 13. The housing 12 has, for example, a fluid passage 14 extending from the interior of the fluid system, into the interior portion of the housing 12. Within the housing 12 is a pressure communicator 16, which at least partially interacts with the fluid in the fluid system. The pressure communicator 16 has a portion designed to maintain fluid contact and a portion which is to be isolated from the fluid. The interior of the housing 12 is divided into a fluid portion 18, which is in fluid communication with the fluid system of interest, and a non-fluid portion 22. This partitioning is achieved with a fluid diaphragm 20, which can be associated with the pressure communicator 16. The fluid diaphragm 20 is made of a membrane material such as metal, rubber, rubber-coated woven material, plastic, silicones, fluorosilicones, and/or other polymeric material, having varying degrees of flexibility. The fluid diaphragm 20 acts as a sealing element between the fluid portion 18 and the non-fluid portion 22 of the housing 12, and may also act as a flexible element to allow for the pressure communicator 16 to be axially displaceable.

Figure 4:
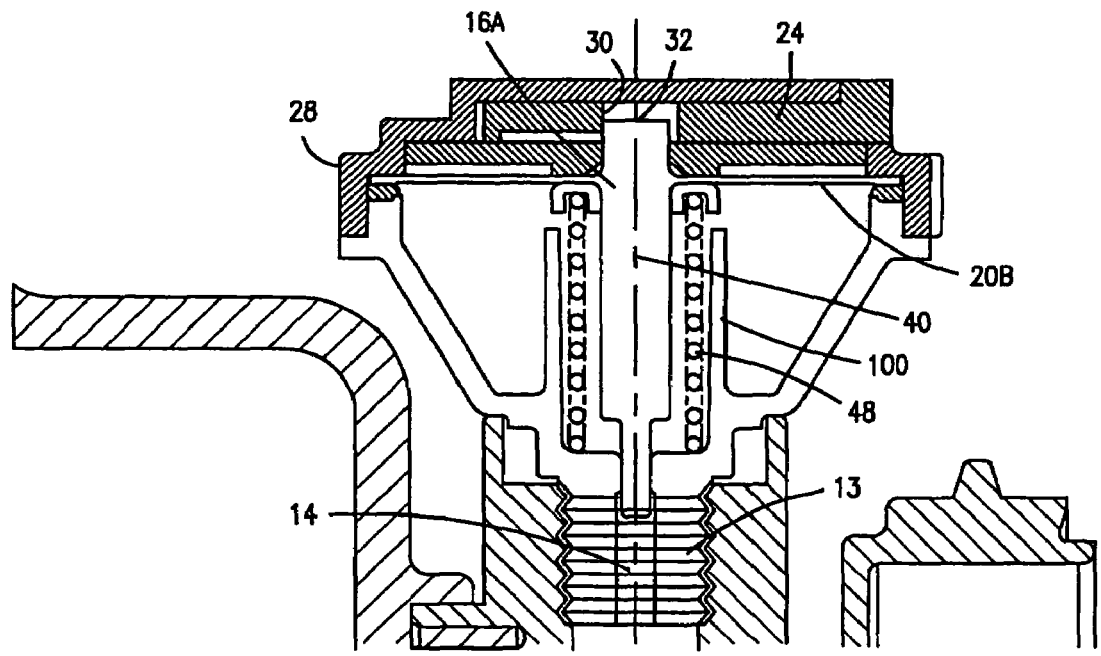
FIG. 4 is a cut-away view of a filter change indicator having a one-piece pressure communicator and diaphragm.
Figure 9A:
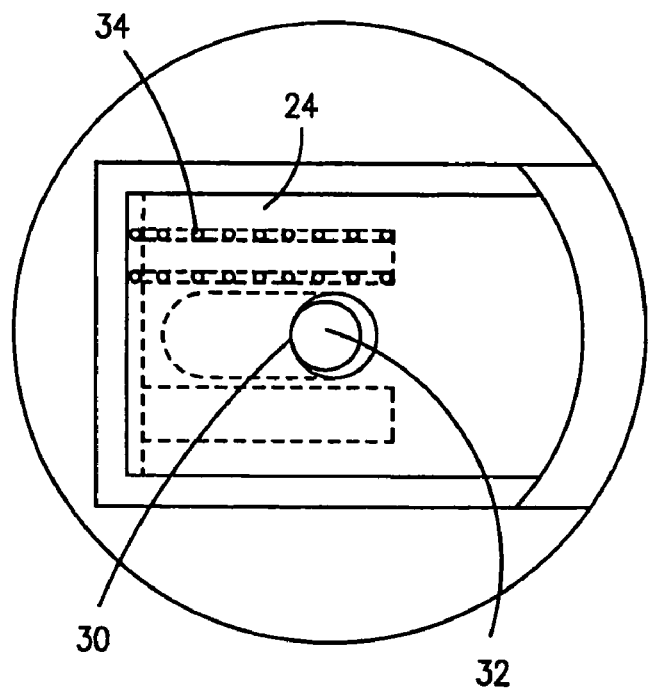
FIGS. 9A and 9B are a top plan view, partially in phantom, and a cut away view respectively of a filter change indicator.
Figure 9B:
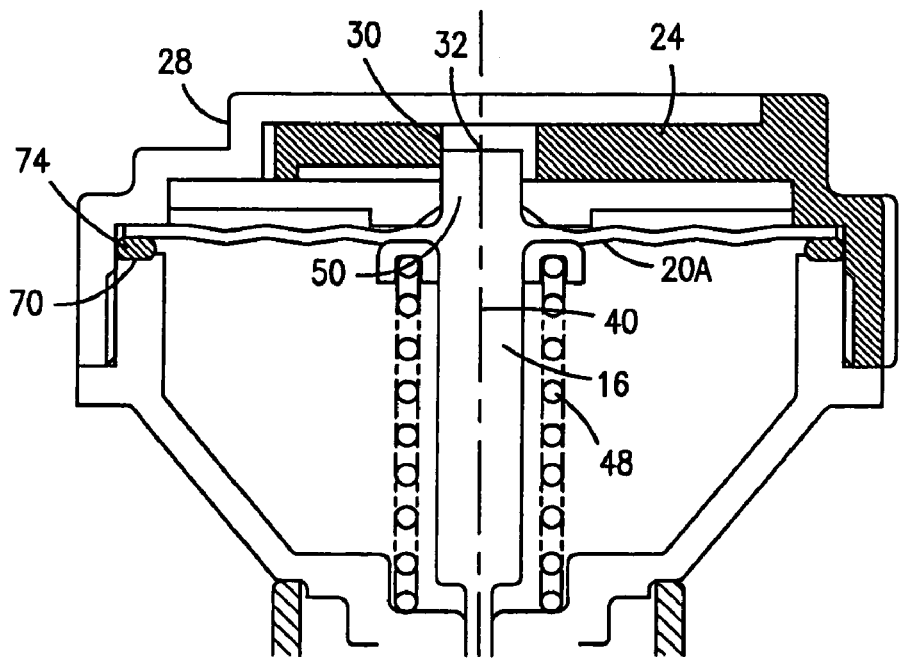

In one embodiment of the invention, the fluid diaphragm 20B is an integral part of the pressure communicator 16A. For example, as shown in FIG. 4, the fluid diaphragm 20B is formed of the same material as the pressure communicator 16A and is preferably formed out of plastic or metal. In a one-piece configuration, the diaphragm 20B has a substantially planar form which extends radially away from an axial center line 40 of the pressure communicator 16A. In another embodiment, as illustratively shown in FIGS. 9 and 10, a fluid diaphragm 20A has a cross-section with alternating ridges and troughs. These alternating ridges and troughs, in some cases, function to define the flexure of the fluid diaphragm 20A during operation. The fluid diaphragm 20A and 20B in the one-piece configuration may exhibit differing degrees of flexibility due to characteristics and/or proportions of its composite material. For example, the thickness of the material can be varied, or the material can be suitably treated to enhance or suppress the rigidity of the material to provide the selected pre-established flexure characteristics. The selected characteristics allow the diaphragm to be tuned at a desired damping rate to dampen out certain pressure spikes for pre-defined transient time intervals.

The non-fluid system portion 22 of the housing 12 contains a projectable indicator 24. This projectable indicator 24 is selectively moveable such that a portion or portions of the indicator 24 can project through an opening or openings 26 in a cap 28 of the housing 12. The projectable portion or portions extend past the exterior surface of the housing 12 as shown in, for example, FIG. 2. The projectable portion, when projected, changes the overall configuration of the filter change indicator 10. For instance, the projectable indicator 24 in one position is entirely housed within the housing 12. Thus, no significant portion of the projectable indicator 24 extends outside of the housing 12. The indicator 24 moves into a second projected position either in a single step or through incremental steps. In the projected position, a portion of the indicator 24 protrudes exteriorly from the housing 12. This protrusion changes the shape of the exterior of the housing 12. In one form, the indicator moves in a lateral direction relative to the axial center line 40 of the filter change indicator.

In one embodiment of the invention, the indicator 24 has a portion, which is contained within the housing 12, and a portion that is extended from the housing through, for example, openings 26. When actuated by a higher than normal pressure differential, the contained portion and extended portion of the indicator 24 are simultaneously moved into and out of the housing cap openings 26. For example, one portion may be colored green and the other portion may be colored red. This color-coding provides a visual indication as to the filter status in addition to the exterior tactile-shape change.

The indicator 24 has an engagement surface 30, which mechanically engages an actuator portion 32 of the pressure communicator 16. The pressure communicator 16 in operation moves due to pressure generated in the fluid system. The engagement between the actuator 32 and the indicator 24 is altered by movement of the pressure communicator 16. The altered engagement allows the indicator 24 to be moved in, for example, a lateral direction which is assisted by a first tensioning spring 34, which exerts a constant biasing pressure on the indicator 24 in a substantially unidirectional fashion.

Figure 8A:
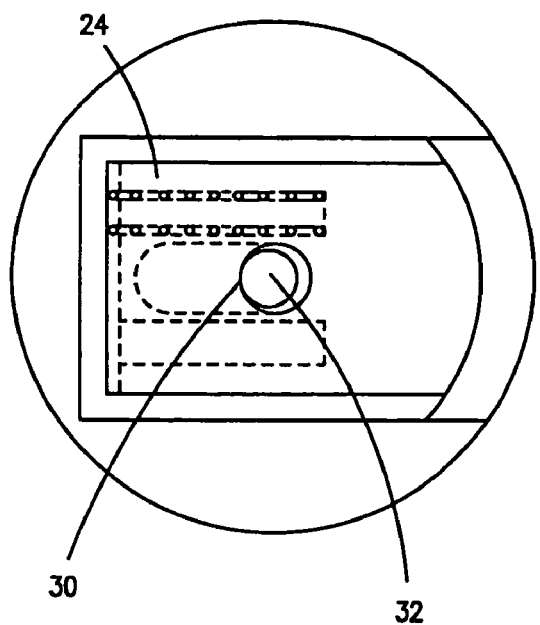
FIGS. 8A and 8B are a top plan view, partially in phantom, and a cut away view respectively of a filter change indicator.
Figure 8B:
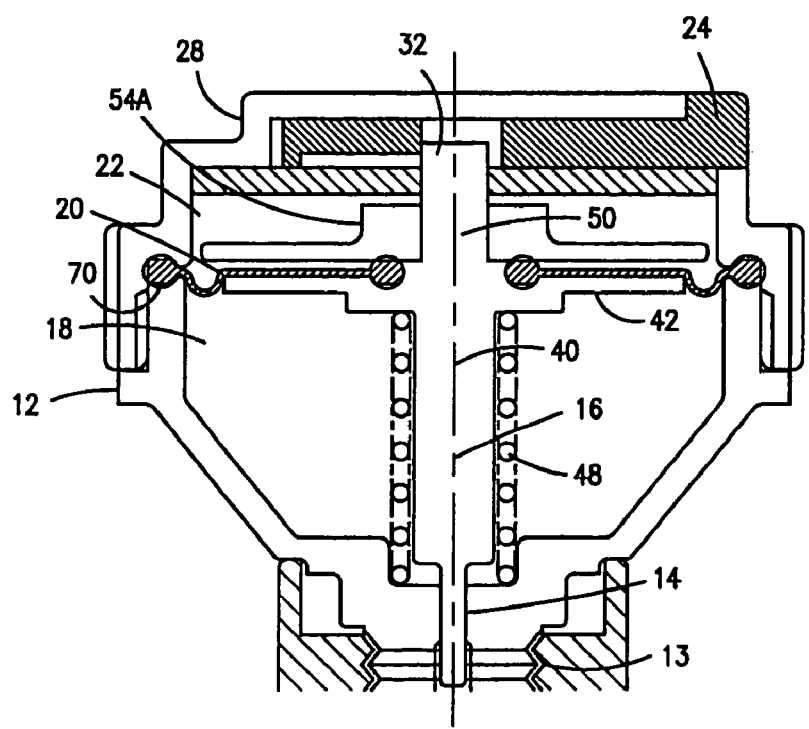

In one embodiment of the invention, the pressure communicator 16 may have a first end 36 and a second end 38 with an axial centerline 40 extending between these ends. The pressure communicator can be configured to include differing cross-sectional portions intermediate the first end 36 and the second end 38, as illustratively shown in FIG. 8. The pressure communicator 16 is displaceable along the axial center line 40. A web portion 42 extends radially relative to the axial center line 40 and supports and interacts with the fluid diaphragm 20 in order to maintain the sealing integrity of the diaphragm 20. The web portion 42 may also act to modulate the flexibility of the fluid diaphragm 20 such that portions of the diaphragm 20 are not deformed with similar flexibility characteristics. The web portion 42 of the pressure communicator 16 may extend out toward an interior wall of the housing 12 equidistantly such that a gap 56 exists between an edge 58 of the web portion 42 and an interior wall or surface of the housing 12. In one embodiment of the invention, as illustratively shown in FIG. 10, a first portion 43 of the pressure communicator 16C is associated with a second portion 147 of the pressure communicator. The second portion 147 of the pressure communicator is formed integral with the fluid diaphragm 20C.

Figure 2:
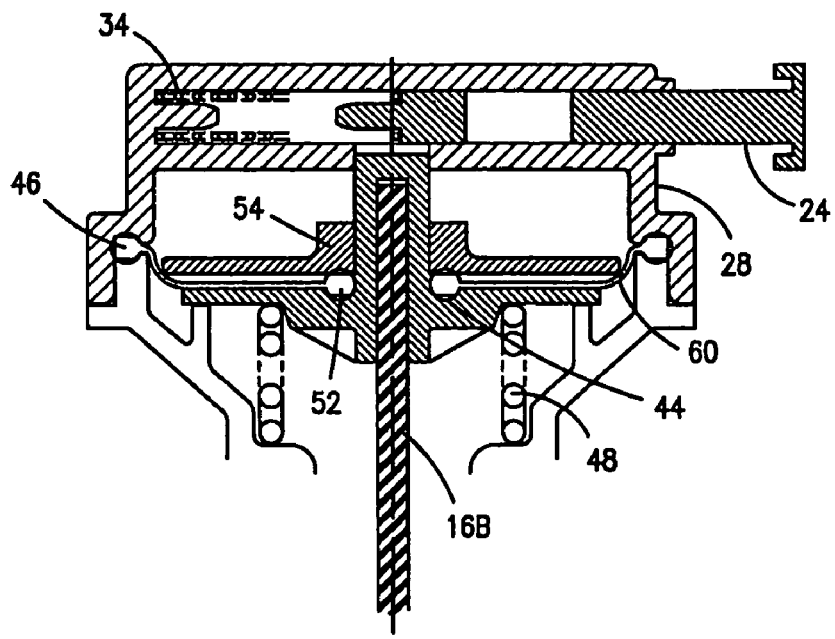
FIG. 2 is a cut-away view of the filter change indicator in a position with the projectable indicator extended.
Figure 3:
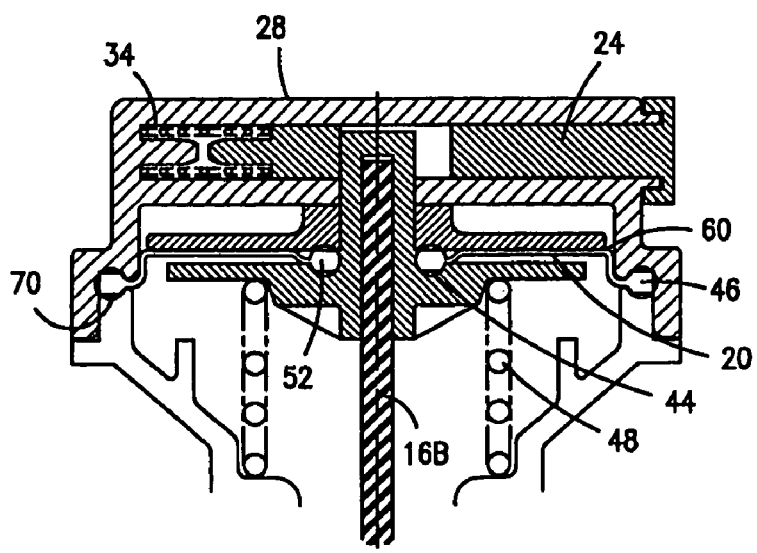
FIG. 3 is a view of the filter change indicator of FIG. 2 in a non-extended position.

The pressure communicator 16, as illustratively shown in FIGS. 2 and 3, may also have an engagement surface 44, such as an arcuate slot, which interacts with an inner lip portion 52 of the fluid diaphragm 20. The inner lip portion 52 ensures that fluid cannot pass between the fluid diaphragm 20 and the engagement surface 44 under normal circumstances. The fluid diaphragm 20 may also have a housing sealing lip 46. With the fluid diaphragm 20 in place, the interior of the housing is divided by the fluid diaphragm 20 into a fluid portion 18 and a non-fluid portion 22. A portion of the pressure communicator 16 extends through the diaphragm 20 such that the pressure communicator 16 is present in both fluid 18 and non-fluid 22 portions of the housing 12 as shown in at least FIG. 1. The portion of the pressure communicator 16 extending into the non-fluid portion 22 of the housing may have cylindrical protrusion 50, wherein a portion of the cylindrical protrusion includes the actuator 32. A sealing washer 54 is provided over the protrusion 50 such that it can be screwed or pressed into place to create or aid in creating a fluid and/or pressure tight seal between the fluid diaphragm 20 and pressure communicator 16. For example, the sealing washer contacts the inner lip portion 42 such that the inner lip portion is held in firm contact with the pressure communicator 16. The sealing washer 54A can extend away from the axial centerline 40 toward the interior surface of the housing 12. The sealing washer 54A, in some cases, may extend radially a distance which is substantially less than, co-extensive with, or greater than the distance the web portion 42 extends radially.

The pressure communicator 16, in one embodiment of the invention, interacts with a second spring 48 or pressure communicator spring which biases the pressure communicator 16 in a unidirectional fashion such that engagement portion 32 is maintained in a stable position relative to the engagement surface 30 of the pressure indicator 24 during normal pressure ranges in the fluid system. The pressure communicator spring 48 is mounted in association with a tubular portion 100 of the housing. The tubular portion may define part of the fluid pathway between the fluid portion 18 and the fluid system.

The fluid diaphragm 20 is associated with the pressure communicator 16 and may be disc-shaped with a diameter greater than that of a pressure communicator web 42. The fluid diaphragm 20 extends beyond the interior surface plane of the housing 12. The portion extending beyond the interior surface plane of the housing includes a housing sealing lip 46 which fits into an arcuate slot 47 formed in the housing wall or it may interact with a similar structure in the housing 12. The housing sealing lip 46 is fluidly secured through use of the cap 28, which may be pressed or screwed down against the housing sealing lip 46 of the fluid diaphragm 20. The fluid diaphragm 20 has a flexible portion 60, which spans the gap 56 between the end 58 of the web and the interior wall of the housing. This can, among other things, allow for displacement of the pressure communicator 16 while still maintaining the fluidly separated environment within the housing.

Figure 10A:
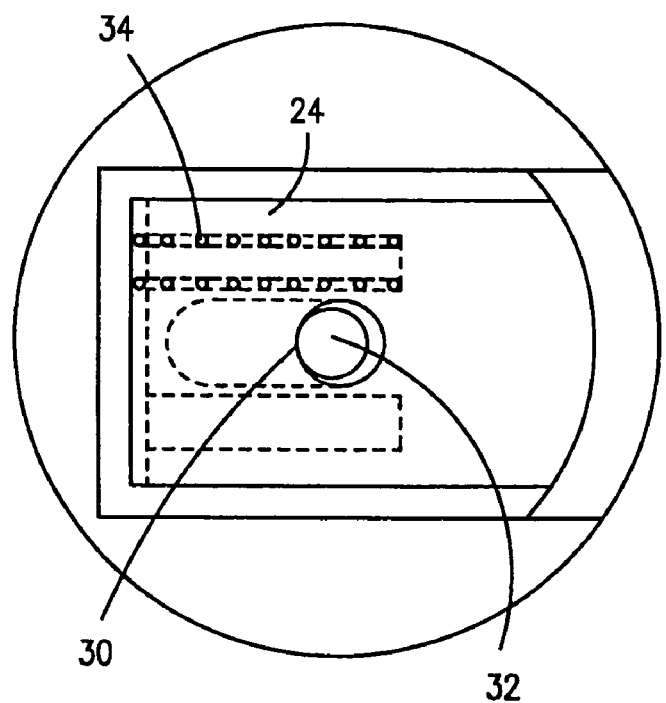
FIGS. 10A and 10B are a top plan view, partially in phantom, and a cut away view respectively of a filter change indicator.
Figure 10B:
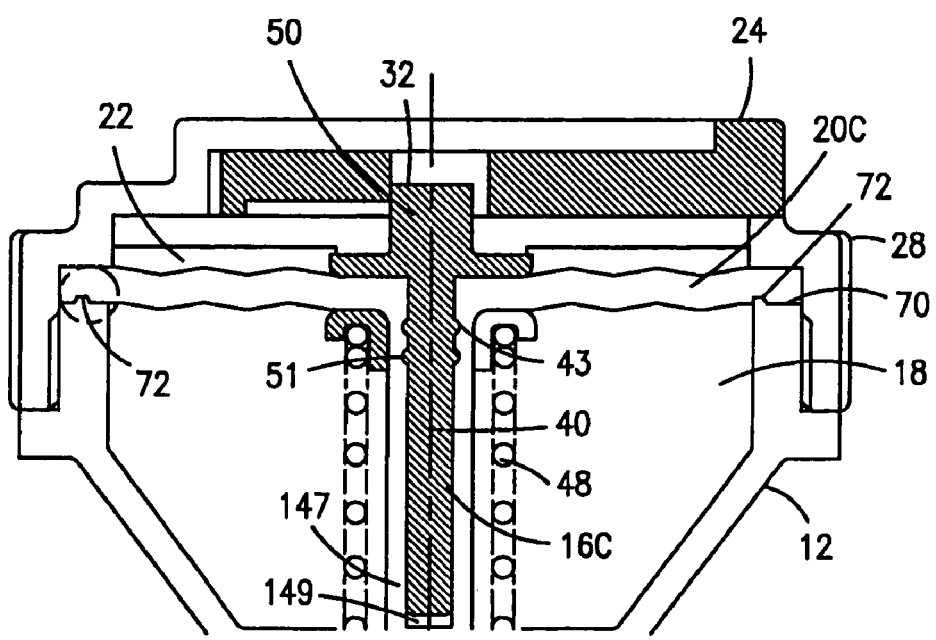
Figure 11:
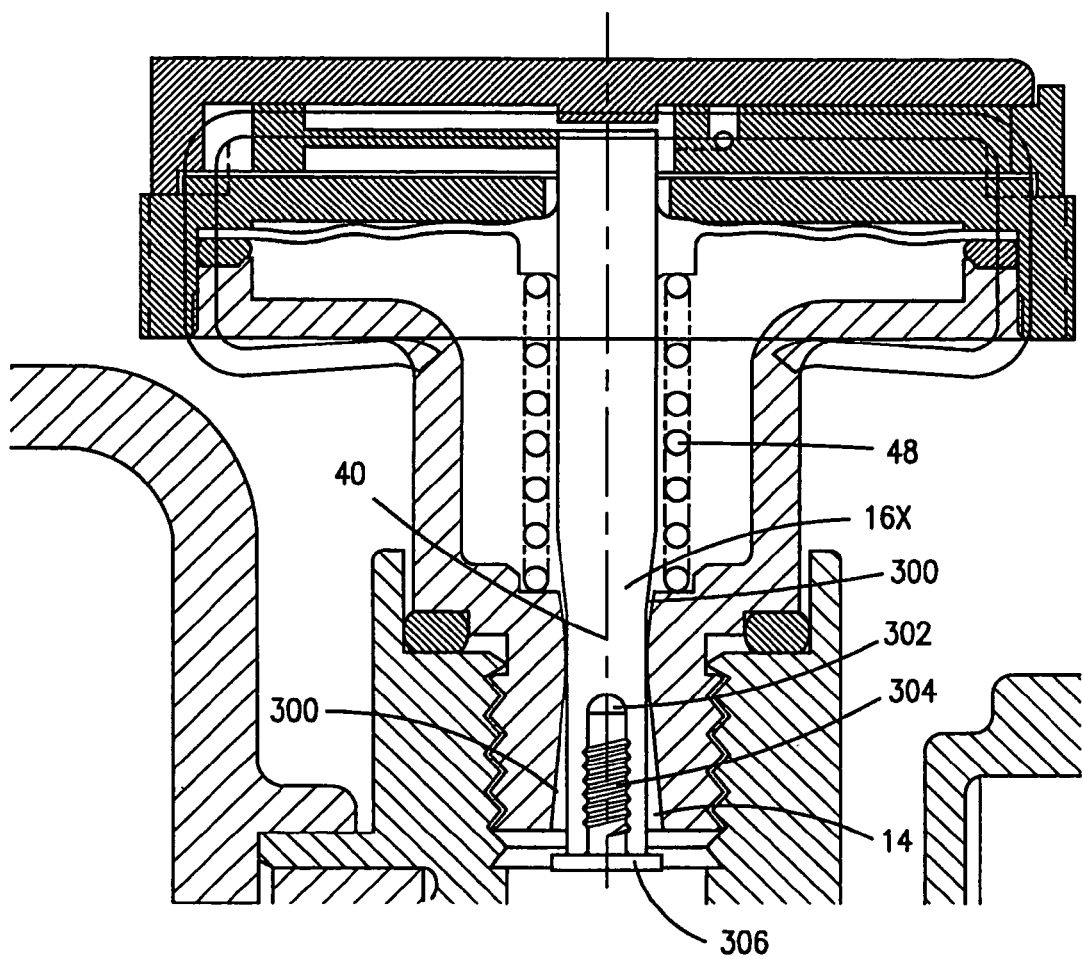
FIG. 11 is a cut-away view of a filter change indicator having a crash safety feature.
Figure 12A:
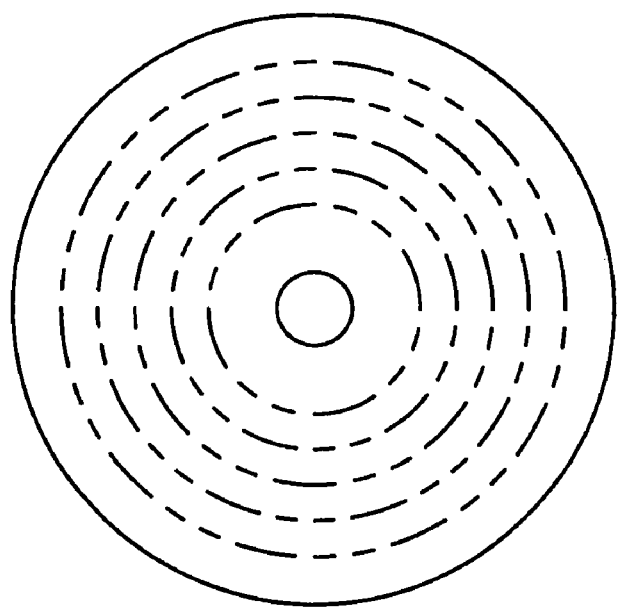
FIGS. 12A and 12B are a top view of a force communicator and a side view of a force communicator respectively.
Figure 12B:
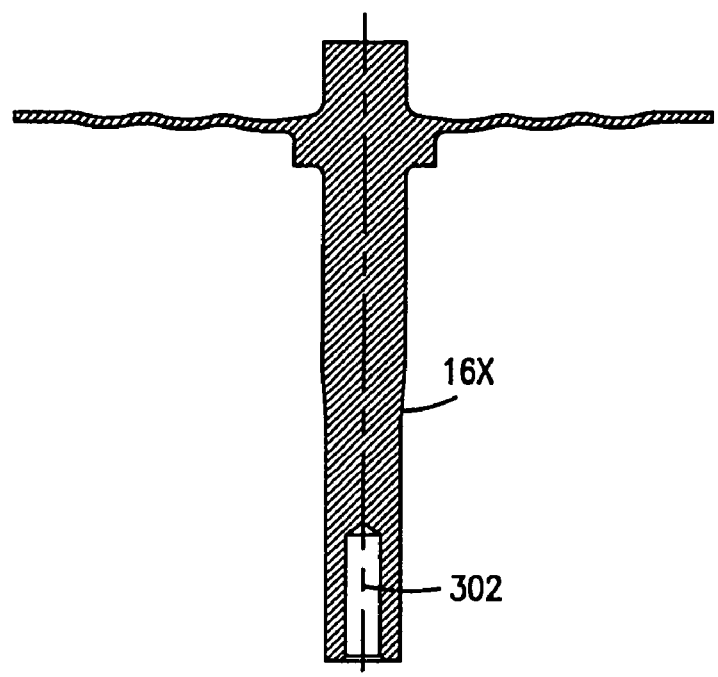

In one embodiment of the invention, the housing has a shelf 70 upon which a portion of the fluid diaphragm 20, the housing sealing lip 46, and/or an O-ring 74 rests. The shelf 70 may have vertical sealing ridges 72, which interact with the resting element, for instance, when the cap 28 is associated with the housing 12. FIG. 10 illustratively shows two variants of the sealing ridges 71.

Figure 6:
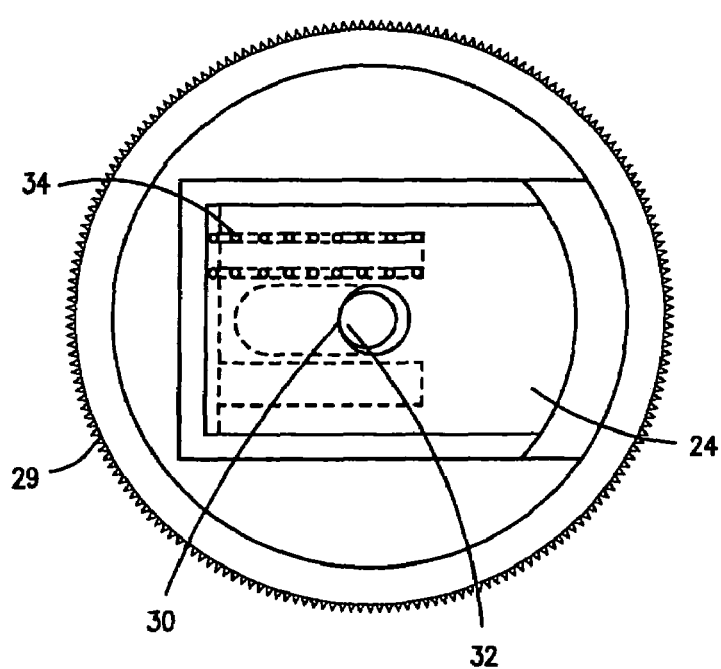
FIG. 6 is a top plan view, partially in phantom, of a filter change indicator.
Figure 5:
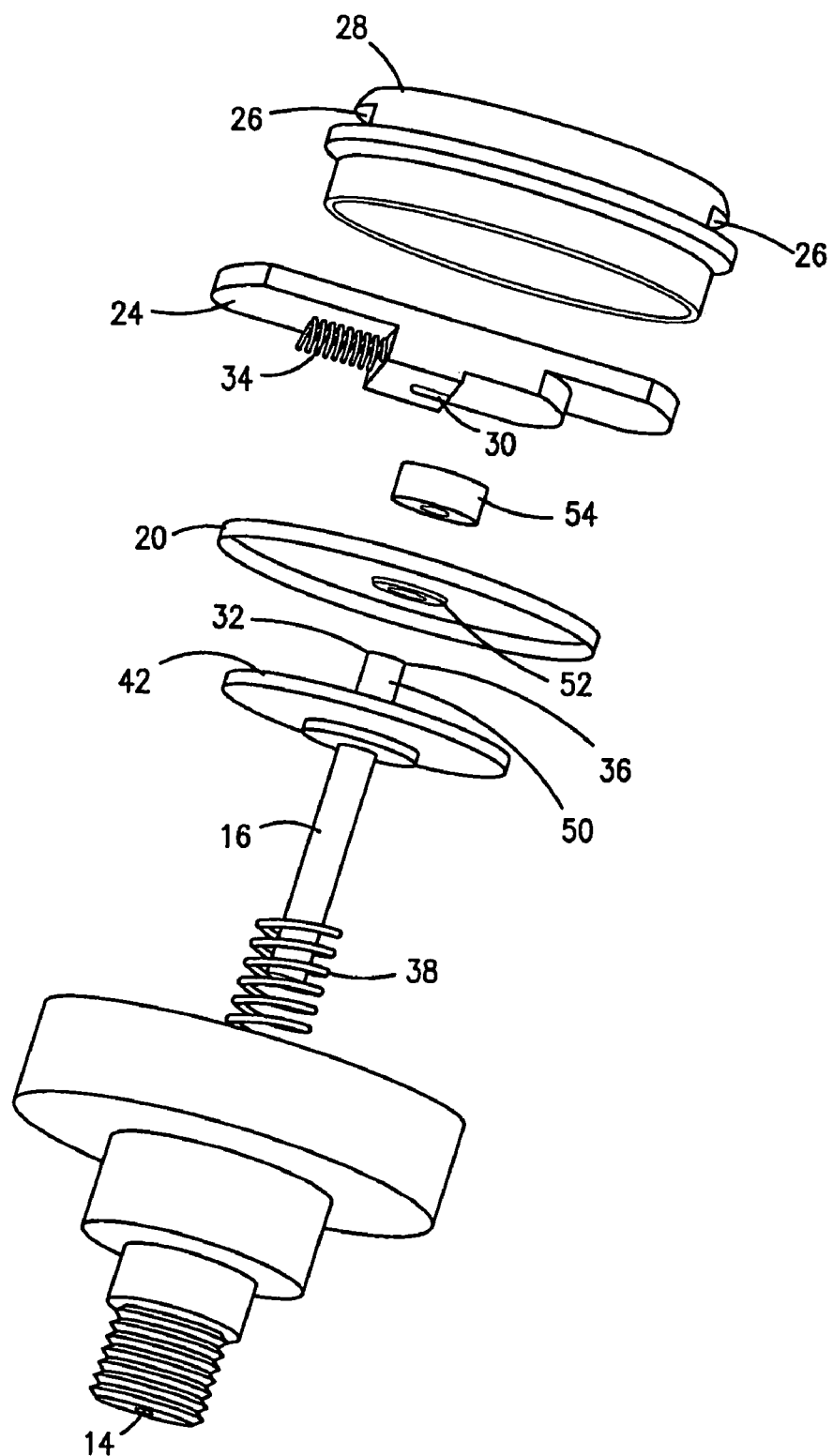
FIG. 5 is an exploded view of the filter change indicator showing various elements of the filter change indicator.
Figure 7:
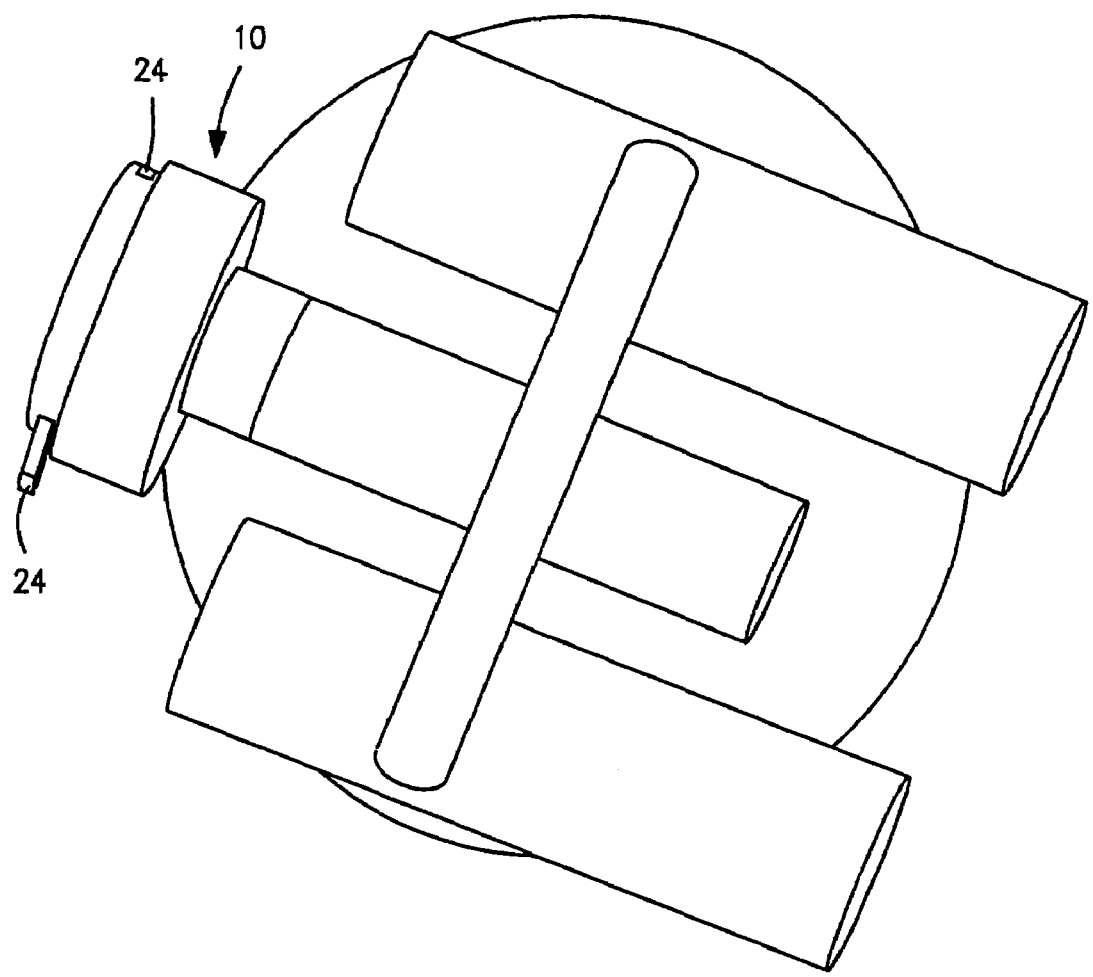
FIG. 7 is a bottom plan view of a filter housing from the end with an associated filter change indicator.
Figure 13C:
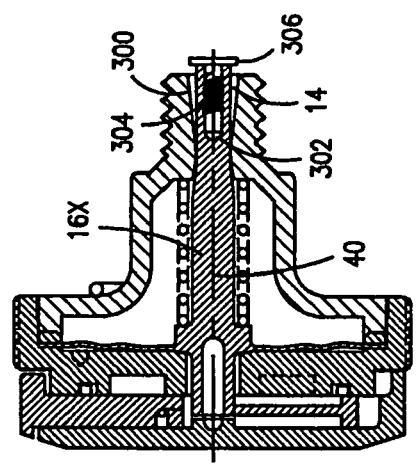
FIG. 13C is a cut away view of a filter change indicator as shown in FIGS. 13A and 13B.
Figure 13B:
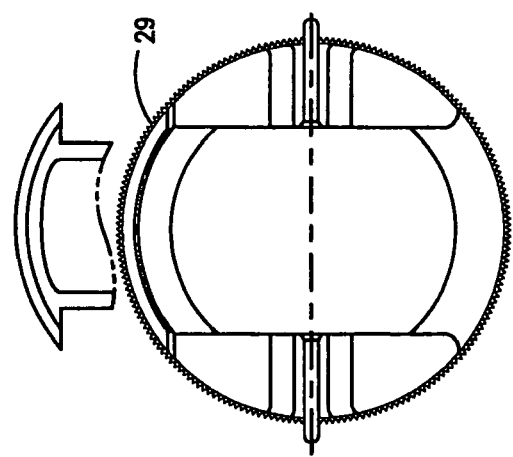
FIGS. 13A and 13B are a side plan view and a top plan view respectively of a filter change indicator.
Figure 13A:
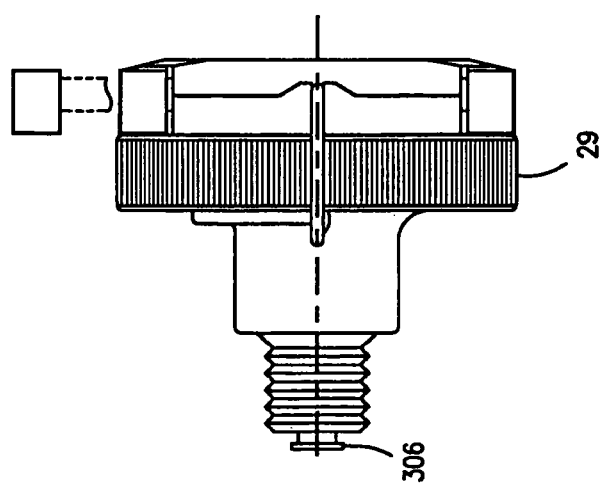

When connected to a fluid system, a portion 102 of the pressure communicator 16 extends into the fluid pathway 14. This can allow for such things as a modulation of the fluid flow rate between the fluid portion 18 and the fluid system. In some cases, it is necessary to ensure that the fluid portion 18 of the housing 12 is fully flooded with the fluid from the fluid system. The exterior of the housing 12 may, as shown in FIGS. 6, 13A, and 13B, have a knurled portion 29 to facilitate removal to vent air from the fluid system. In this regard, the filter change indicator functions as an effective air vent as well as a change indicator.

During operation, for instance, when the fluid system is pressurized, the fluid system pump is moving fluid through the filter. A differential pressure is created across the filtration membrane or other filtering structure. This differential pressure typically is of a nature that a lower pressure exists on the filtrate side of the filter. The fluid diaphragm 20 and associated pressure communicator 16 of the filter change indicator 10 are subjected to a differential pressure proportionally relative to this pressure differential across the filter. As the filter becomes occluded, and the differential of pressure across the filter changes due to a restriction of fluid flow through the filter, the pressure communicator 16 is forced against the second spring 48. As the filter occlusion increases over time due to an increased accumulation of material filtered out of the fluid, the actuator portion 32 disengages from the engagement surface 30 of the indicator 24, thus allowing the indicator 24 to be forced by the first spring 34 into a second or subsequent position. For instance, the engagement surface 30 of the indicator may have a step-like configuration as shown in, at least, FIG. 1. This step-like configuration is designed so as to allow the actuator portion 32 to retreat away from the indicator engagement surface 30 incrementally.

In operation, the height of each step of the engagement surface 30 and the lateral displacement distance of the indicator 24 can be correlated with different filter occlusion levels. The step-like configuration allows for an identification of differing degrees of filter occlusion as increased pressure is exerted upon the pressure communicator and fluid diaphragm. In operation, for example, the pressure communicator 16 is pulled downward against the biasing pressure of the second spring 48. The indicator 24 is then allowed to move incrementally laterally along the subsequent step-like engagement surface 30 as the pressure communicator 16 descends.

In addition, during operation in, for instance, low temperature environments a transient increase in the pressure differential may occur. For instance, in extremely cold weather, fluid may thicken, gel, or may contain solidified waxes or other non-fluid components. These temperature-related changes create transient higher pressure differentials across the filter along with a higher pressure differential between the fluid portion 18 and non-fluid portion 22 of the filter change indicator housing 12. Often these higher than expected differentials last for only a short time duration and dissipate when fluid warmed by, for example, engine heat, and/or a fluid heater reaches the filter element. Once warmed up, the thickening, wax formations, and/or gelling dissipate and the pressure differential drops to within a normal range.

In one embodiment of the invention, these transient higher differential pressures are moderated or otherwise compensated for with a delay in the filter change indicator actuation. The delay can be anywhere from about 0.25 seconds to about 5.0 seconds but preferably between about 1 to 2 seconds. This delay may be accomplished by, for example, the flexible portion 60 of the fluid diaphragm 20 which spans the gap 56 between the end 58 of web portion 42 of the pressure communicator 16 and an interior structure or surface of the containment vessel 12. This flexible portion 60 allows for a certain amount of buffering of the higher short term pressure differentials. For example, in a system that has a fluid heater in addition to a filter and pump, the fluid heater may warm the fluid such that the viscosity and/or other properties are kept within normal operational ranges. However, often a small volume of the fluid may not have been warmed due to the distance from the heater. This non-warmed fluid may then be caused to pass through the filter by the pump. Compensation or buffering of the higher differential pressure can occur through the pre-established flexure resistance of the flexible portion 60 of the fluid diaphragm 20 which, due to its elasticity, creates a lag in the transmission of pressure to the pressure communicator 16. Thus, the pressure communicator 16 does not move within the short time duration that it takes warmer fuel to reach the filter element. This lag time can prevent misleading actuation of the filter change indicator.

In one embodiment of the invention, the lag in response can be effectuated through use of dimensioning of certain elements to produce a combination of surface areas and/or mass that will move with a delayed fashion in response to transient high pressure differentials. For instance, the mass of components and/or spring tension profiles may be designed to resist sudden movement. In addition, the fluid passages leading from the fluid passage may be dimensioned such that the internal structures of the filter change indicator are not subjected to sudden pressure changes due to fluid transfer limitations.

In one embodiment of the invention, a fluid change indicator, which has changed shape through protrusion of a portion of the indicator 24, is reset by pressing, for example, with a finger on the exterior of the extended portion of the indicator 24 in a direction toward the housing 12. This pressing moves the indicator 24 in a direction counter to the first spring 34 and back into the housing 12. Since the pressure communicator is under continuous biasing pressure by the second spring 48, the actuator portion 32 re-engages with the engagement portion 30 of the indicator. For example, in operation a mechanic can push the extended portion of the indicator 24 back into the housing 12, resetting the indicator portion, and then operate the fluid system to monitor and determine whether or not the indicator is again actuated.

Mechanically, in one embodiment of the invention, the pressure generated by the second spring 48 is designed to be greater than the pressure exerted on the pressure communicator 16 during normal fluid system operation. As an example, the second spring 48 has a biasing pressure, which keeps the actuator portion 32 engaged with the indicator engagement portion 30 at all pressure differentials below a predetermined filter occlusion level. The differential pressure across the filter can be determined for different filter occlusion states and can be correlated to differential pressures developed in the housing 12. A filter with, for instance, a 75% occlusion can be correlated with a certain pressure differential across the fluid portion 18 and the non-fluid portion 22 of the filter change indictor 10. This correlated pressure is then used for selection of an appropriate biasing device such as the second spring 48. Also factored into this equation, among other things, can be the force of the engagement surface 30 against the actuator 32 generated by the first spring 34. Thus, a frictional force may be present between the actuator portion 32 and the indicator engagement surface 30 such that second spring 48 does not require the total biasing force of the correlated pressure due to the occlusion level.

In one embodiment of the invention a crash safety feature is present. The crash safety feature operates to prohibit or retard fuel flow through the filter change indicator 10 in the event the filter change indicator is damaged by, among other things, an impact event. For example, a filter change indicator present on a vehicle may be damaged in the event of the vehicle crashing. Such damage may result from, for example, a crushing and/or a shearing force being applied to the filter change indicator 10. This force may cause structural failure of one or many portions of the filter change indicator. The structural failure of the one or many portions can result in a fluid containment breach. The fluid escaping from the filter change indicator if flammable or corrosive may pose a serious safety hazard.

The crash safety feature may include a pressure communicator 16x having a tapering configuration along portions of its axial length. This tapering configuration is configured to cooperatively associate with a tapered bore 300 during, for example, application of a crushing force. The tapered bore 300 forms a portion of the fluid passage 14. In the event of a crushing force being applied to the filter change indicator, the tapered portion of the pressure communicator 16x is driven into cooperative association with the tapered bore 300. This cooperative association may seal off, or otherwise inhibit fluid flow through the fluid passage 14. The pressure communicator 16x may also have a connecting surface such as a threaded portion, dimensioned portion, and/or a cavity 302. For example, the cavity 302 may be configured to receive a screw 304 having a head 306.

In one embodiment of the invention the pressure communicator 16x may be formed of a material that will operate to bend out of axis in response to, for example, a shearing force being applied to the filter change indicator 10. In the event a shearing force is applied to the filter change indicator a portion of the pressure communicator 16x may bend and a portion of the pressure communicator may be pulled through the tapered bore 300. As the portion of the force communication is pulled through the tapered bore 300, the screw head 306 is forced into association with the tapered bore 300. It should be understood that the second end 39 of the pressure communicator 16x may have various configurations, and may be associated with a variety of shaped elements which serve to associate with the tapered bore 300.

While the preferred embodiments have been shown to describe the invention, various modifications and substitutes may be made thereto without departing from the spirit and scope of the invention. Accordingly, it is to be understood that the present invention has been described by way of illustration and not limitation.

The invention claimed is:

1. A fluid system/pressure indicator combination comprising:
   a fluid system having a fluid pathway extending between a fluid pump and a filter element;
   a housing having an interior fluid portion in fluid communication with the fluid pathway, said housing having a cover with an opening;
   an axially displaceable pressure communicator having an actuator within the housing, said communicator being at least partially in fluid contact with the fluid system;
   a fluid diaphragm fluidly separating the actuator from the fluid system;
   an indicator spring exerting an axial pressure on the pressure communicator;
   a projectable indicator having an actuator engagement surface and at least one portion which is projectable through the opening to an exterior of the housing; and
   said indicator spring exerting a biasing pressure on the indicator such that when the projectable actuator and actuator engagement surface are not in engagement, a portion of the projectable indicator is projected through the opening to an exterior of the housing.

2. The fluid system/pressure indicator combination of claim 1, wherein the fluid diaphragm is an integral part of said axially displaceable pressure communicator.

3. The fluid system/pressure indicator combination of claim 1, wherein the fluid system includes a filter mounting base in fluid communication with the interior portion of the housing.

4. The fluid system/pressure indicator combination of claim 1, wherein when a pressure is applied to the at least one projected portion of the indicator, the actuator will re-engage the actuator engagement surface.

5. The fluid system/pressure indicator combination of claim 1, further comprising an impact safety feature wherein fluid communication between the interior fluid portion and the fluid pathway is selectively interruptible by a portion of the axially displaceable pressure communicator.

6. The fluid system/pressure indicator combination of claim 5, wherein the portion of the axially displaceable pressure communicator dimensioned to operatively engage a tapered bore.

7. A one piece component for response to a pressure differential comprising a plastic diaphragm and a plastic shaft axially projecting integrally from a central location of said diaphragm wherein said diaphragm has a pre-established flexure characteristic which results in a dampened displacement of said shaft in response to a pressure of said shaft in response to a pressure differential exerted against said diaphragm.

8. The fluid system/pressure indicator combination of claim 6, wherein an exterior of the housing includes a knurled portion.

9. The fluid system/pressure indicator combination of claim 6 wherein the fluid system is connected with the housing by a coupling which comprises an externally threaded portion.

10. The fluid system/pressure indicator combination of claim 6, wherein a fluid communication passage of said housing further passes through a tubular portion, said tubular portion also defining a portion of a spring mount for the first spring.

11. The fluid system/pressure indicator combination of claim 10, wherein a portion of the pressure communicator extends partially into the fluid communication passage.

12. The fluid system/pressure indicator combination of claim 6, wherein the pressure communicator has a first end and a second end with a central axis extending between the first end and the second end, a fluid diaphragm support web radially extending about the central axis, and a fluid diaphragm receiving slot disposed about the actuator.

13. The fluid system/pressure indicator combination of claim 12, wherein the pressure communicator fluid diaphragm support web is non-perforated and is substantially planar.

14. The fluid system/pressure indicator combination of claim 13, wherein the fluid diaphragm has a containment vessel sealing portion, a flexure portion, a fluid diaphragm web contact portion, a pressure communicator sealing portion configured to engage said fluid diaphragm receiving slot, and a pressure communicator actuator passage, said flexure portion extending between the fluid diaphragm web contact portion and the containment vessel sealing portion.

15. The fluid system/pressure indicator combination of claim 14, wherein the containment sealing portion mechanically interacts with a sealing surface of the containment vessel and a sealing surface of the cover to provide a fluid tight diaphragm.

16. The fluid system/pressure indicator combination of claim 14, further including a sealing ring that is disposed about the actuator, said sealing ring being in mechanical contact with the pressure communicator sealing portion such that the pressure communicator sealing portion is held in engagement with the fluid diaphragm receiving slot.

17. The fluid system/pressure indicator combination of claim 14, wherein there is a gap between an edge of the fluid diaphragm support web and an interior wall of the containment vessel, said gap being spanned by the fluid diaphragm flexure portion.

18. The fluid system/pressure indicator combination of claim 6, wherein the indicator is extendable through the cover in a series of discrete increments.

19. The fluid system/pressure indicator combination of claim 18, wherein the indicator has markings corresponding to the discrete increments.

20. The fluid system/pressure indicator combination of claim 6, wherein the unidirectional pressure exerted on the pressure communicator by the pressure communicator spring is less than a sum of a mechanical pressure exerted on the pressure communicator and a fluid pressure correlated to a filter obstruction level.

\* \* \* \* \*